United States Patent
Dutu et al.

(10) Patent No.: US 11,288,095 B2
(45) Date of Patent: Mar. 29, 2022

(54) ENHANCED ATOMICS FOR WORKGROUP SYNCHRONIZATION

(71) Applicant: Advanced Micro Devices, Inc., Santa Clara, CA (US)

(72) Inventors: Alexandru Dutu, Bellevue, WA (US); Matthew D. Sinclair, Bellevue, WA (US); Bradford M. Beckmann, Bellevue, WA (US); David A. Wood, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 269 days.

(21) Appl. No.: 16/588,872

(22) Filed: Sep. 30, 2019

(65) Prior Publication Data

US 2021/0096909 A1    Apr. 1, 2021

(51) Int. Cl.
*G06F 9/46* (2006.01)
*G06F 9/48* (2006.01)
*G06F 9/52* (2006.01)

(52) U.S. Cl.
CPC .............. *G06F 9/4881* (2013.01); *G06F 9/52* (2013.01); *G06F 2209/521* (2013.01)

(58) Field of Classification Search
CPC ........ G06F 9/4881; G06F 9/52; G06F 9/5027; G06F 9/505; G06F 9/3836; G06F 2209/521; G06F 2209/503
See application file for complete search history.

(56) References Cited

U.S. PATENT DOCUMENTS

| | | | | |
|---|---|---|---|---|
| 4,584,644 | A * | 4/1986 | Larner | G06F 9/52 710/260 |
| 5,515,538 | A * | 5/1996 | Kleiman | G06F 9/4812 710/260 |
| 5,528,513 | A * | 6/1996 | Vaitzblit | H04L 29/06027 348/E7.073 |
| 5,752,031 | A * | 5/1998 | Cutler | G06F 9/52 718/103 |
| 2003/0208521 | A1* | 11/2003 | Brenner | G06F 9/4881 718/103 |
| 2006/0130061 | A1* | 6/2006 | Bauer | G06F 9/526 718/100 |

(Continued)

OTHER PUBLICATIONS

Diamos, G., et al., "Presistent RNNs: Stashing Recurrent Weights On-Chip", 10 pgs., Proceedings of the 33rd International Conference on Machine Learning, New York, 2016.

(Continued)

*Primary Examiner* — Emerson C Puente
*Assistant Examiner* — Zhi Chen
(74) *Attorney, Agent, or Firm* — Volpe Koenig

(57) ABSTRACT

A technique for synchronizing workgroups is provided. The techniques comprise detecting that one or more non-executing workgroups are ready to execute, placing the one or more non-executing workgroups into one or more ready queues based on the synchronization status of the one or more workgroups, detecting that computing resources are available for execution of one or more ready workgroups, and scheduling for execution one or more ready workgroups from the one or more ready queues in an order that is based on the relative priority of the ready queues.

20 Claims, 5 Drawing Sheets

(56) References Cited

U.S. PATENT DOCUMENTS

| | | | | |
|---|---|---|---|---|
| 2010/0023559 | A1* | 1/2010 | McKenney | G06F 9/30087 |
| | | | | 707/E17.009 |
| 2012/0210325 | A1* | 8/2012 | de Lind van Wijngaarden | ........... |
| | | | | G06F 1/329 |
| | | | | 718/103 |
| 2015/0293173 | A1* | 10/2015 | Tsuboi | G06F 11/08 |
| | | | | 714/727 |
| 2019/0034151 | A1 | 1/2019 | Dutu et al. | |
| 2020/0379820 | A1 | 12/2020 | Dutu et al. | |

OTHER PUBLICATIONS

Diamos, G., "Presistent RNNs 30 times faster RNN layers at small mini-batch sizes", 6 pgs., Mar. 25, 2016 (downloaded from https://svail.github.io/persistent_mns/).

* cited by examiner

ENHANCED ATOMICS FOR WORKGROUP SYNCHRONIZATION

STATEMENT OF GOVERNMENT INTEREST

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Accelerated processing devices ("APDs") are massively parallel computing devices. Due to the massively parallel nature, meaning that a very large number of execution threads are permitted to be executing concurrently at any given time, some tasks that are relatively simple on more mainstream processors like central processing units ("CPUs") are relatively more difficult on APDs. One such task is synchronization of parallel threads of execution. On CPUs, an operating system typically implements a pre-emptive multi-tasking scheme, whereby an executing thread of execution is "pre-empted" by a scheduling interrupt after a certain amount of execution time, so that a different thread can receive some processing time. Synchronization of threads, such as via a barrier instruction or a synchronization monitor, is relatively trivial in such a scheme, because threads that are stalled at a barrier or monitor are simply not afforded a time-slice in the multi-tasking scheme. Synchronization of threads on an APD, such as via a barrier instruction or a synchronization monitor, is typically more difficult than on a CPU.

BRIEF DESCRIPTION OF THE DRAWINGS

A more detailed understanding can be had from the following description, given by way of example in conjunction with the accompanying drawings wherein.

DETAILED DESCRIPTION

A technique for synchronizing workgroups is provided. The techniques comprise detecting that one or more non-executing workgroups are ready to execute, placing the one or more non-executing workgroups into one or more ready queues based on the synchronization status of the one or more workgroups, detecting that computing resources are available for execution of one or more ready workgroups, and scheduling for execution one or more ready workgroups from the one or more ready queues in an order that is based on the relative priority of the ready queues.

Figure 1:
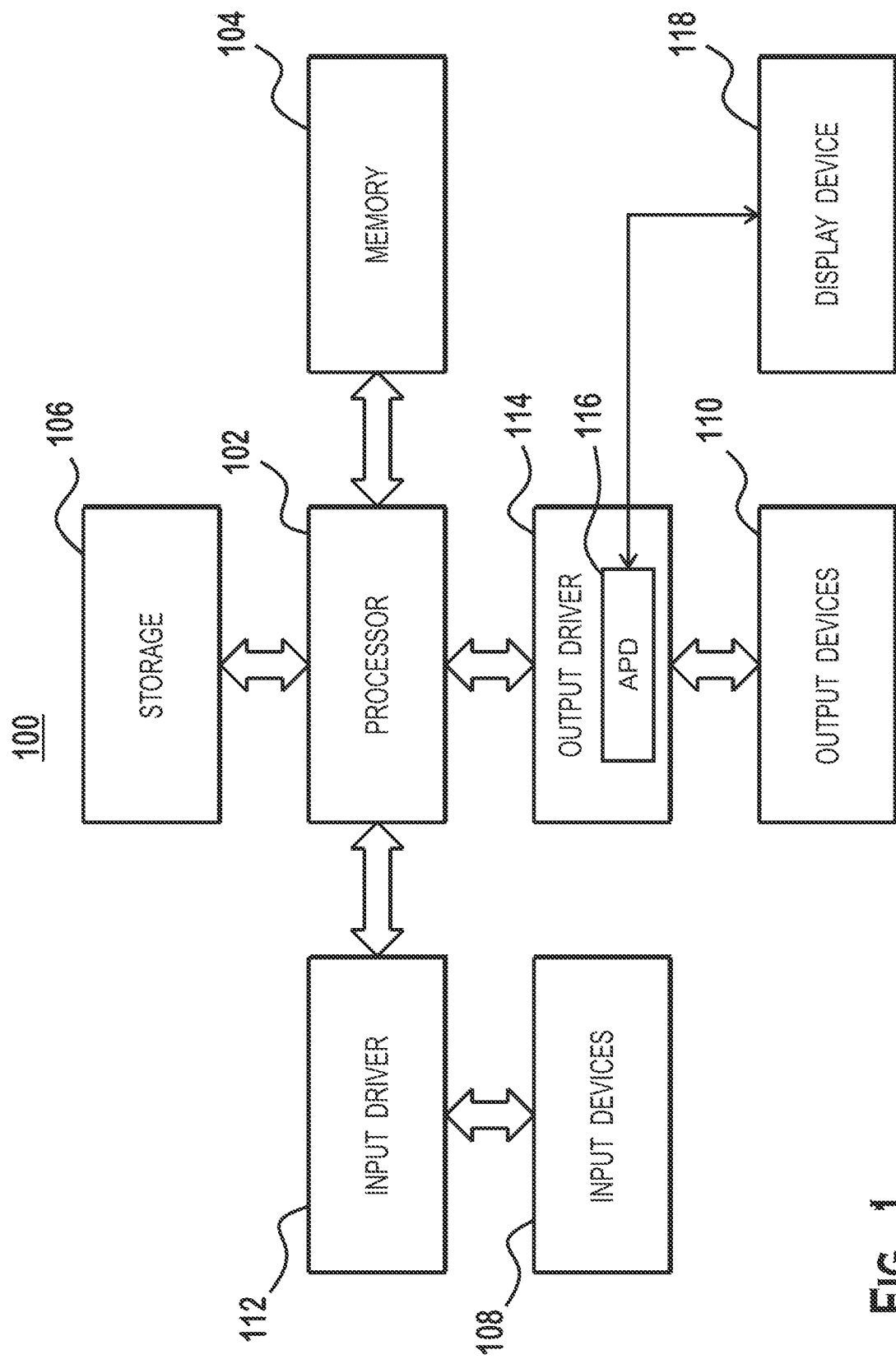
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
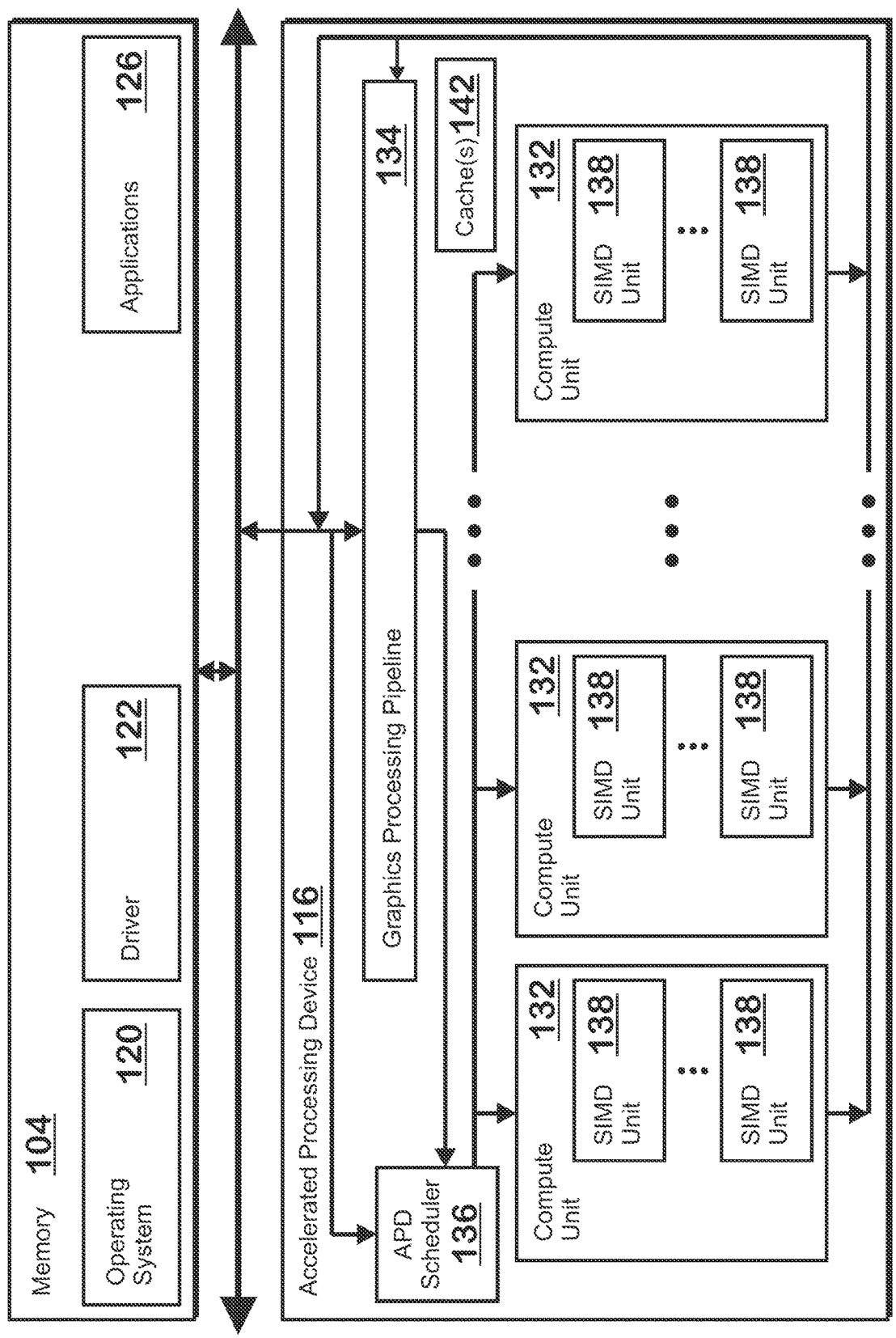
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The APD 116 includes one or more caches 142 that are accessible to the compute units 132. The caches 142 implement a cache coherent protocol to allow data stored in any individual cache 142 to be accessible to any of the compute units 132.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs ("kernels") that define such computation tasks to the APD 116 for execution.

The basic unit of execution in compute units 132 is a work-item. Each work-item represents a single instantiation of a program (also sometimes referred to as a "kernel") that is to be executed in parallel in a particular lane. Work-items can be executed simultaneously (or partially simultaneously and partially sequentially) as a "wavefront" on a single SIMD processing unit 138. One or more wavefronts are included in a "workgroup," which includes a collection of work-items designated to execute the same program. A workgroup can be executed by executing each of the wavefronts that make up the work group. In alternatives, wavefronts are executed on a single SIMD unit 138 or on different SIMD units 138. An APD scheduler 136 is configured to perform operations related to scheduling various workgroups and wavefronts on compute units 132 and SIMD units 138. In an example of usage, an application 126 indicates to the APD 116 the manner in which to execute a kernel, in terms of the "size" of an execution of the kernel, where "size" indicates the number of work-items. In some modes of operation, the application 126 also specifies how work-items are divided into workgroups. In other modes of operation, the APD 116 and/or driver 122 determines how to divide the work-items into workgroups. The size of the execution of the kernel, and the number of work-items to be executed per workgroup, determines how many workgroups are to be executed for a given kernel execution. These workgroups are executed by the APD 116. The APD scheduler 136 assigns the workgroups to a compute unit 132 for execution based on the availability of computing resources (e.g., how many workgroups are assigned to a particular compute unit 132, and whether other resources, such as memory, registers, or other resources are available).

Figure 3:
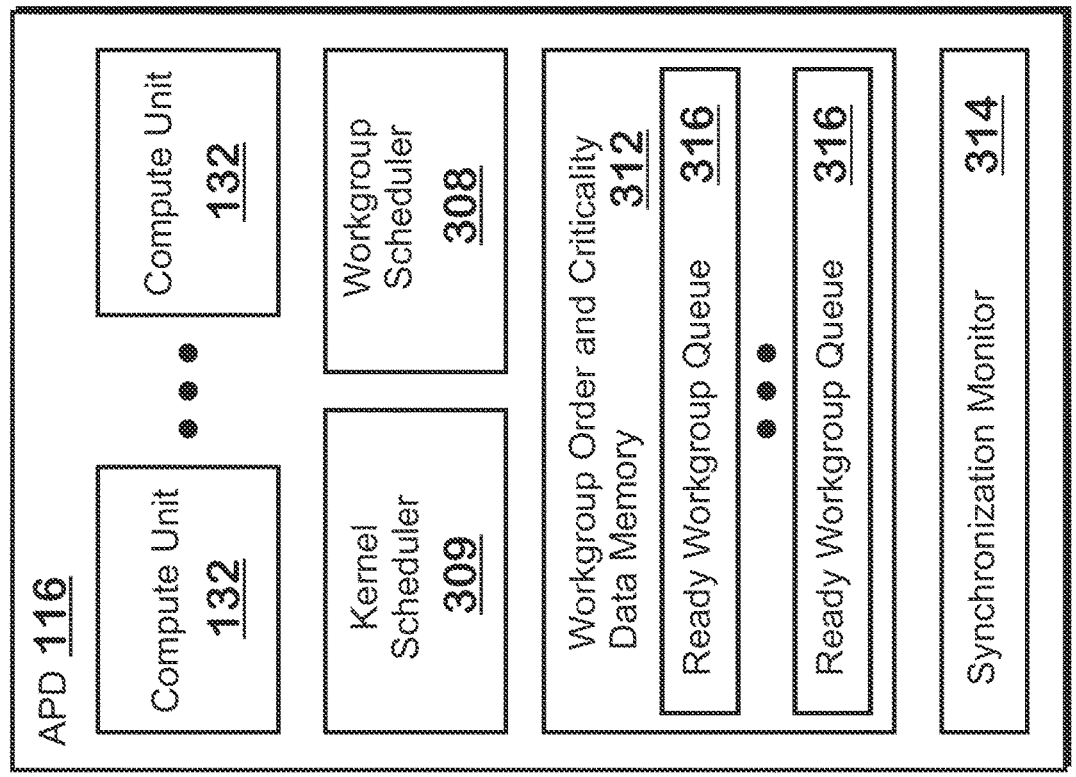
FIG. 3 illustrates details about multi-scheduling operations in an APD 116, according to an example.

FIG. 3 illustrates details about multi-scheduling operations in an APD 116, according to an example. The APD 116 includes a kernel scheduler 309, a workgroup scheduler 308, a workgroup order and criticality data memory 312, and a synchronization monitor 314. Although FIG. 3 illustrates one of each of these items, external to the compute units 132, various implementations may include more than one of any of the kernel scheduler 309, workgroup scheduler 308, a workgroup order and criticality data memory 312, and a synchronization monitor 314, and any of these units may be internal to or external to a compute unit 132.

The kernel scheduler 309 performs pre-emptive time sharing of compute-units 132 by kernels. More specifically, compute units 132 may be over-subscribed by kernels, meaning that the number of kernels assigned to execute on a compute unit 132 is greater than the amount of resources that can support such execution at the same time. Thus, the kernel scheduler 309 time-shares the compute units 132 among kernels. When a given time-slice expires for a particular kernel, the kernel scheduler 309 deschedules the workgroups of that kernel, saving state (e.g., register values, program counter values, flag values, and other state) for that kernel and triggers other kernels to execute. Descheduling a workgroup means that the workgroup no longer executes and no longer consumes hardware resources such as registers, functional units, scratchpad memory, or the like. Descheduling a workgroup occurs as a result of kernel-level pre-emptive scheduling. If a workgroup that is executing on a particular set of SIMD units 138 gets descheduled, then the workgroup stops executing on those SIMD units 138, the state for that workgroup is saved to a memory location, and the SIMD units 138 are made available for use by other workgroups. Descheduling a workgroup is contrasted with stalling a workgroup, where the workgroup remains resident in the compute unit 132, but is no longer executing. Descheduling a workgroup has the benefit that the execution units assigned to a workgroup may be used by another workgroup, but has the drawback that saving and restoring state is time-consuming. By contrast, stalling a workgroup means that the workgroup remains in place in the compute unit 138, but that forward progress is stopped. Stalling a workgroup has the benefit that state for the workgroup does not need to be backed up and re-loaded, but has the drawback that the execution resources used by the stalled workgroup is not made available for other workgroups.

The kernel scheduler 309 may afford different priority levels to different kernels and may deschedule lower priority kernels so that higher priority kernels may execute. The priority level for a kernel may be set through any technically feasible means such as by the program that triggers launch of that kernel. Additionally, all resident workgroups of a kernel are descheduled as a result of the pre-emptive kernel scheduler 309, but in some situations, not all such workgroups can be scheduled back in. For example, it may be that when a kernel is scheduled back in, a lesser amount of resources is available because a higher priority kernel has been scheduled for execution in the meantime.

A workgroup scheduler 308 performs multitasking scheduling operations for workgroups within a kernel. The workgroup scheduler 308 implements a cooperative scheduling paradigm, whereby workgroups within a kernel indicate to the workgroup scheduler 308 that such workgroups are waiting. A waiting workgroup can be context switched out or the waiting workgroup can be stalled depending on whether the kernel associated with the workgroup is over-subscribing hardware resources (i.e., there is not enough available hardware resources to execute all of the workgroups for the kernel concurrently). In response, if other workgroups are ready to be scheduled, then the workgroup scheduler 308 schedules the other workgroups that are ready. If there are not enough available computing resources for the ready workgroups, then the workgroup scheduler 308 deschedules stalled workgroups, saving the state for those workgroups. If there are enough available computing resources for the ready workgroups, then the workgroup stalls and is not context switched out. A waiting workgroup that is waiting on a condition is resumed when the waiting condition of the workgroup is met. When resuming, a context-switched out workgroup will be context-switched back in and start executing, whereas a stalled workgroup will simply start executing.

As described above, a workgroup may be context-switched out from execution on the compute unit 132 the workgroup is assigned to, or may be caused to stall on the compute unit 132 the workgroup is assigned to because the workgroup is waiting. Herein, a phrase such as "a non-executing workgroup" refers to a workgroup that is descheduled, a workgroup that is waiting, a workgroup that is stalled, or a workgroup that is part of a kernel but has not yet been scheduled to start execution. A non-executing workgroup may either be ready to execute or may be not ready to execute. For a workgroup that is made non-executing due to executing a wait instruction to wait on a condition, that workgroup becomes ready when the condition is satisfied. For a workgroup that is made non-executing due to being descheduled by the kernel scheduler 309, the workgroup becomes ready when the kernel scheduler 309 indicates that the kernel should again execute. In some examples, the kernel scheduler 309 is instructed (e.g., by the processor 109 or another execution unit on the APD 116) to execute a particular kernel with a higher priority than a kernel already executing in a compute unit 132. If there are not sufficient resources in the compute unit 132 to execute the higher priority kernel, the kernel scheduler 309 may deschedule at least some of the workgroups of the lower priority kernel, causing those workgroups to be non-executing. Subsequently, when resources are freed, for example due to the higher priority kernel ending or for some other reason, the kernel scheduler 309 marks the workgroups of the lower priority kernel as ready to execute again.

When a workgroup is non-executing and becomes ready to execute, the workgroup scheduler places the workgroup into a ready workgroup queue 316 in the workgroup order and criticality data memory 312. Each ready workgroup queue 316 is associated with a certain type of ready workgroup and has a priority relative to other ready workgroup queues in the criticality data memory 312. The workgroup scheduler 308 schedules workgroups from the criticality data memory 312 in priority order. More specifically, the workgroup scheduler 308 schedules workgroups in the highest priority queue first, then workgroups from the next highest priority queue, then workgroups from the next highest priority queue, and so on. In some implementations, the workgroup scheduler 308 schedules all workgroups of a higher priority queue before scheduling any workgroups of a lower priority queue.

The term "synchronization" means allowing one or more parallel threads of execution (here, workgroups) to continue execution once a condition may have been met. One example of synchronization is a mutual exclusion object that allows only one of the parallel threads of execution to execute the critical section at a given time. Additionally, when a parallel thread of execution arrives at a critical section and a precondition for execution of the critical section is not met, the parallel thread of execution waits until the condition is met. The condition is reflected in the pair of a synchronization variable and a waiting value. The condition is considered to be met when the synchronization variable is set to a value that is deemed to meet the condition, the waiting value, and is considered not to be met when the synchronization variable is set to a value that is not deemed to meet the condition.

The synchronization monitor 314 tracks updates to monitored addresses. An address is monitored if the address is passed as an operand to a wait instruction. The wait instruction specifies an address to monitor and a waiting value. The condition is considered satisfied when the value at the monitored address reaches the waiting value. The synchronization monitor keeps track of other synchronization statuses of workgroups. Another type of synchronization status is whether a workgroup is in a critical section. Workgroups are able to execute instructions that inform the synchronization monitor 314 that the workgroup enters a critical section and also that the workgroup leaves a critical section. A critical section is a portion of a program that can be executed only by one workgroup at a time. Critical sections are used in conjunction with synchronization primitives to ensure proper multi-tasking operation. It is advantageous to schedule ready workgroups within critical sections prior to executing workgroups that are not participating in synchronization operations because workgroups in critical sections may be blocking execution of other workgroups that are trying to enter the critical section. A workgroup is participating in a synchronization operation if the workgroup has executed an enhanced atomic instruction that indicates that the workgroup is in a critical section or if the workgroup has executed a wait instruction.

There are three types of enhanced atomic instructions: one indicates that a workgroup has started a critical section, another indicates that the workgroup has ended a critical section, and a third indicates an expected order for workgroups of a kernel to execute a critical section to be executed. An ordered instruction is an instruction whose return value indicates the order in which multiple workgroups are expected to execute a critical section. As stated above, a workgroup executing an atomic order instruction is considered to be participating in a synchronization operation.

Figure 4:
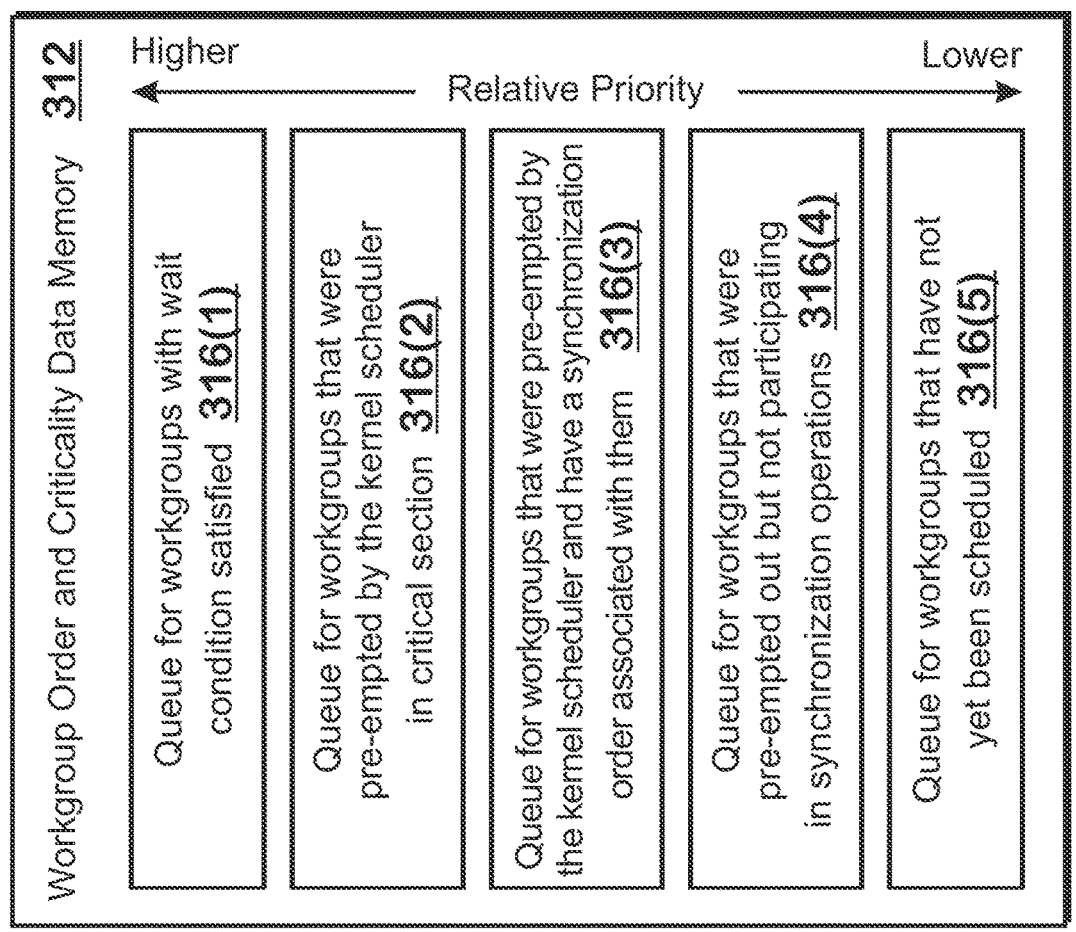
FIG. 4 illustrates example ready workgroup queues, and illustrates their relative priority.

FIG. 4 illustrates example ready workgroup queues 316, and illustrates their relative priority. Queue 316(1) is for workgroups that have executed a wait instruction, have had their wait condition satisfied, and have not yet been schedule for execution after having their wait condition satisfied. In an example, a workgroup executes a wait instruction that waits on the value of the synchronization variable "var" to be equal to 2. The workgroup scheduler 308 causes the workgroup to stall or be context-switched out. When the synchronization monitor 314 detects that var is set to 2, the synchronization monitor 314 informs the workgroup scheduler 308 that the condition is met and the workgroup scheduler 308 places the workgroup into the queue for workgroups with wait condition satisfied 316(1). Because this queue 316 has the highest priority, the workgroup scheduler 308 schedules workgroups in this queue before scheduling workgroups in the other queues 316.

Queue 316(2) is for workgroups that were pre-empted by the kernel scheduler 309 while in the critical section. As described elsewhere herein, workgroups may be pre-empted by the kernel scheduler 309 if a different kernel with high priority than the kernel associated with the workgroup is to be executed on the same compute unit 132 as the workgroup. It is also possible for the kernel scheduler 309 to pre-empt a workgroup in a critical section due to the time-slice for the kernel associated with that workgroup expiring. In addition, workgroups may execute enhanced atomic instructions that indicate to the synchronization monitor 314 when the workgroup enters a critical section and when the workgroup leaves a critical section. Atomic instructions that enter critical sections are generally conditional instructions that return a value indicative of either "true" or "false" based on a specified condition. If the condition is true, then the critical section begins and if the condition is false, then the critical section does not begin. Atomic instructions that exit critical sections are generally instructions that set the value of a variable, and that optionally return the value previously in the variable. Typically, such atomic instructions are used to set the value of a synchronization variable that can be monitored for a waiting thread.

Queue 316(3) is the queue for ordered workgroups. An ordered workgroup is a workgroup that has executed an ordered atomic operation and has gotten descheduled by the pre-emptive kernel scheduler. Such an ordered atomic operation is usually an atomic operation to modify the value stored at a particular memory location, such as a pointer into a buffer. This operation returns the result of the atomic operation, which indicates a workgroup scheduling order. In the situation that the descheduled kernel is scheduled back in for execution and there are not enough resources to accommodate a descheduled workgroup that has an associated order, the descheduled workgroup will be inserted into the queue for descheduled workgroups with ordering 316(3).

This queue 316(3) has the special feature that workgroups in the queue are rescheduled for execution in the order indicated by the return value of the atomic operation completed. In an example, two workgroups have executed an ordered atomic operation. The first workgroup receives a value of 4 and the second workgroup receives a value of 8. The workgroup scheduler schedules the first workgroup for execution before scheduling the second workgroup for execution because the ordering value for the first workgroup is lower than the ordering value for the second workgroup.

The fourth queue 316(4) is the queue for workgroups that were pre-empted out by the kernel scheduler 309 but were not participating in a synchronization operation when pre-empted out. The fifth queue 316(5) is for workgroups that have not yet begun (have not yet been scheduled for execution).

In some examples, the marking of synchronization data for atomic instructions may be accomplished by setting certain bits of the instruction to indicate the specific type of enhanced atomic instruction. In one example, two bits, with four possible values, of an atomic instruction are reserved for this type of synchronization marking. A first value indicates that the atomic instruction is part of an ordered instruction. A second value indicates that the atomic instruction marks the beginning of a critical section. A third value indicates that the atomic instruction marks the end of a critical section. A fourth value indicates that the atomic instruction does not have a synchronization marking.

Figure 5:
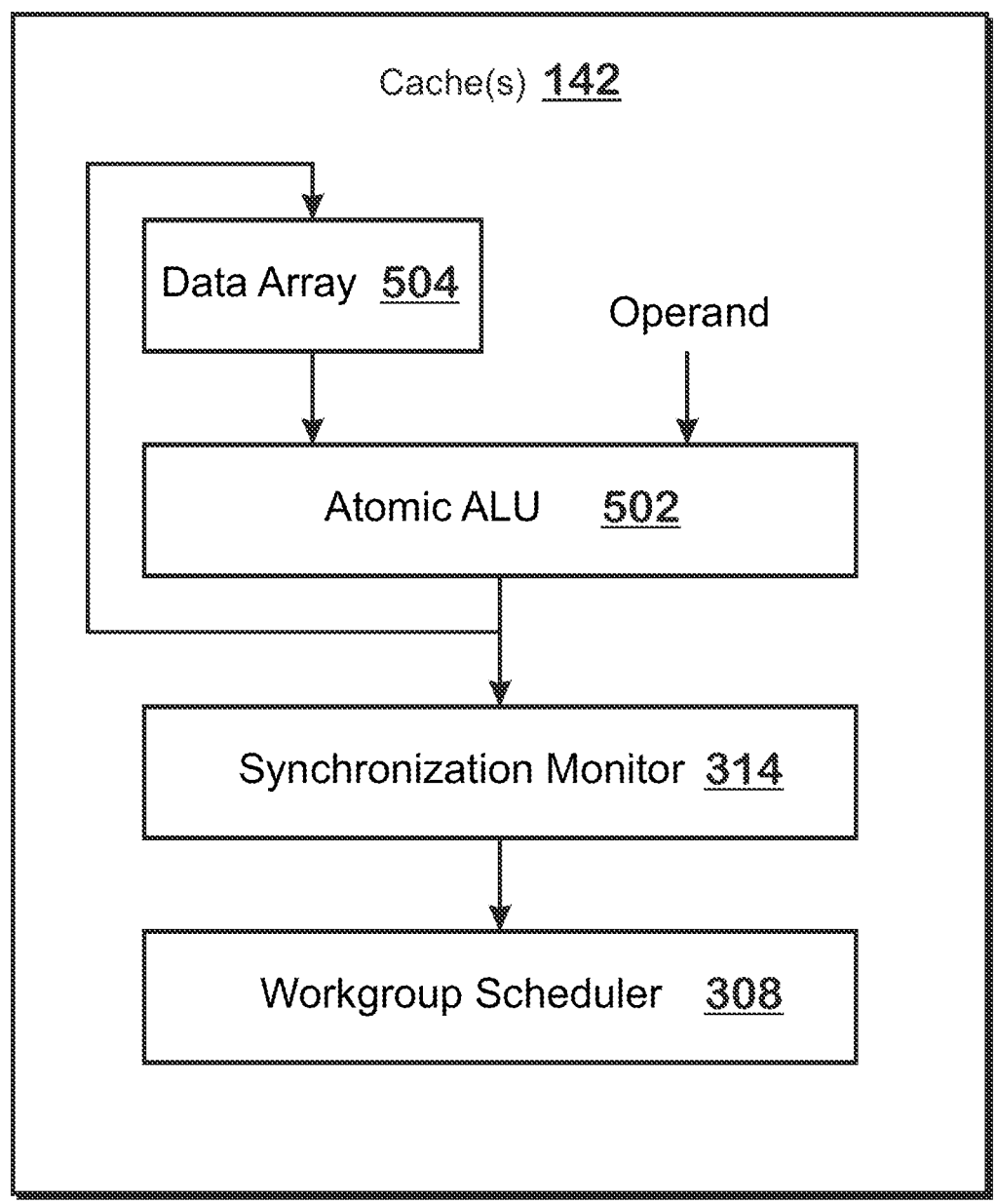
FIG. 5 illustrates details a cache that includes elements for implementing the operations described herein, according to an example.

FIG. 5 illustrates a cache 142 that includes elements for implementing the operations described herein, according to an example. The cache 142 includes a data array 504, an atomic arithmetic logic unit ("ALU") 502, the criticality data memory 312, the synchronization monitor 314, and the workgroup scheduler 308.

The data array 504 is the data-storing portion of the cache 142 and includes, for example, the memory elements for storing data. The atomic ALU 502 performs atomic operations specified by the atomic instructions that include the indications to start or end critical sections or to perform ordered operations. The atomic ALU 502 accepts operands from the data array 504 and from the atomic instruction (shown as the "operand" input to the atomic ALU 502). The return value of the atomic ALU 502 is stored back in the data array 504 and forwarded to the synchronization monitor 314. The synchronization monitor may store this data in any technically feasible location such as a dedicated memory, a cache, or a backing memory. The synchronization monitor 314 instructs the workgroup scheduler 308 to schedule workgroups according to the queues as described elsewhere herein.

In general, the synchronization monitor 314 monitors the execution of atomic instructions and reads from and updates the workgroup order and criticality data memory 312 to indicate the synchronization status of the workgroups. In some examples, the synchronization monitor 314 directly instructs the workgroup scheduler 308 to schedule specific workgroups based on the contents of the criticality data memory 312 (specifically, the queues 316) and the synchronization status of the workgroups. In other examples, the synchronization monitor 314 simply writes the workgroups into the queues 316 and the workgroup scheduler 308 reads the queues 316 to determine which workgroups to schedule.

In some examples, the synchronization monitor is stored in the cache memory 142. The synchronization monitor 314 reads and writes to that criticality data memory 312 and instructs the workgroup scheduler 308 to schedule workgroups based on the contents of that criticality data memory 312. In some examples, the synchronization monitor 314 reads synchronization information from and writes synchronization information to the criticality data memory 312 based on the atomic instructions executed by the workgroups that include synchronization marking information.

An example pseudo-code segment is provided in Table 1 below to illustrate some of the operations described herein.

TABLE 1

Pseudo-code illustrating predefined ordering
for entering the critical section

```
myRingBufferLoc = atomic_add_order(ringBufferTailPtr, 16);
haveLock = false;
while(!haveLock) {
        if(atomic_ldcmp_start((int *) (ringBuffer + myRingBufferLoc),
1) == 1) {
            haveLock = true;
        }
        if(!haveLock) {
            wait((int *)ringBuffer + myRingBufferLoc, 1);
        }
}
// critical section
AtomicExch((int *) (ringBuffer + myRingBufferLoc), -1);
AtomicExch_end((int *) (ringBuffer + nextBufferLoc), 1);
```

The example provided pseudo-code illustrates a ticket mutex, by which each workgroup atomically gets a "ticket" which indicates when that workgroup can execute the critical section. This is contrasted with a simpler mutex type, where the order that a thread can enter the critical section is not pre-specified.

In the pseudo-code of Table 1, an atomic ordering instruction, the "atomic_add_order" instruction, adds two values atomically and places the result in the specified memory location. The two values that are added are the ring buffer tail pointer and the value 16, which is the size of an entry in the ring buffer. This operation is done atomically so that the value received for each workgroup is different and corresponds to a unique slot in the ring buffer. The order in which this operation is completed for a workgroup is the order specified for the workgroup in the queue for ordered workgroups 316(3). Thus the workgroups in this queue are scheduled for execution in the order that corresponds to their location in the ring buffer, when the queue for workgroups with wait conditions satisfied 316(1) and the queue for workgroups that were pre-empted by the kernel scheduler in the critical section 316(2) are both empty (since those queues have higher priority than the queue for ordered workgroups 316(3)).

A while loop attempts to obtain a lock. Specifically, in the while loopan atomic operation that marks the beginning of a critical section is executed. The atomic operation ("atomic_ldcmp_start") compares the value at the address ringBuffer+myRingBufferLoc, which is the ring buffer slot for the workgroup executing the instruction, to the numeric value "1," which indicates that the workgroup is ready to enter the critical section. If the value at the address equals 1, then the workgroup executes the body of the if-statement, where the workgroup sets its haveLock variable equal to true. In addition, the workgroup enters the critical section because the return value from the atomic_ldcmp_start instruction is equal to the expected value. In other words, this atomic instruction, which is marked as "start [critical section]," causes the workgroup criticality data memory 312 to store an indication that the workgroup that executed the instruction is in a critical section, if the atomic instruction returns a value equal to the expected value If the value at the address does not equal 1, then the workgroup order and criticality data memory 312 does not store an indication that the workgroup is in the critical section. In addition, in that instance (the atomic "start [critical section]" operation does not return 1), the workgroup does not set the haveLock variable to true and therefore executes the "wait" instruction. The wait instruction causes the workgroup to be made non-executing. When the wait condition for the wait instruction is satisfied, and the workgroup is ready to be executed (i.e., there is no remaining reason for the workgroup to be non-executing, where an example remaining reason is that the kernel scheduler 309 context-switched out the kernel associated with the workgroup in order to execute a different kernel), the workgroup is placed in the queue for workgroups with wait condition satisfied 316(1). In this instance, the wait condition is that the ring buffer slot for the workgroup stores a value of 1.

Continuing with the example pseudo-code, after a workgroup executes the critical section, the workgroup atomically sets its own ring buffer slot to the value "−1," indicating that it is not the turn of that workgroup to enter the critical section, and then executes an atomic instruction to set the value of the slot in the ring buffer for the next workgroup to the value 1. This second atomic instruction is marked as an end critical section instruction, meaning that upon executing this instruction, the workgroup order and criticality data memory 312 no longer stores an indication that the workgroup is in the critical section. Note that if the next slot in the ring buffer is associated with a workgroup that is waiting on the condition that its slot has a value of 1, then this second atomic instruction satisfies the wait condition for that workgroup, which is then placed in the queue for workgroups with wait condition satisfied 316(1).

Figure 6:
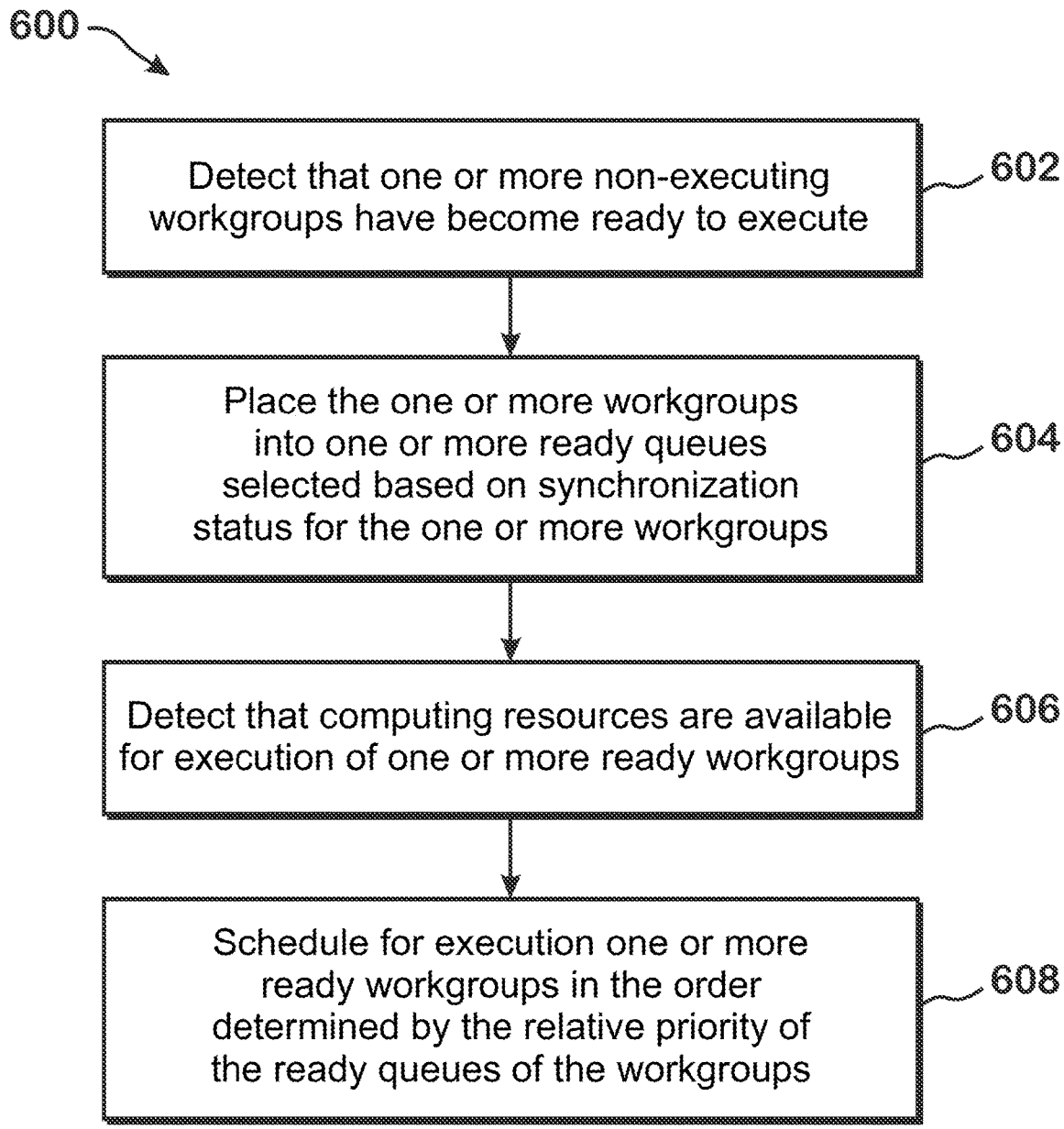
FIG. 6 is a flow diagram of a method for scheduling ready workgroups for execution, according to an example.

FIG. 6 is a flow diagram of a method 600 for scheduling ready workgroups for execution, according to an example. Although described with respect to the system of FIGS. 1-5, those of skill in the art will recognize that any system, configured to perform the steps of method 600 in any technically feasible order, falls within the scope of the present disclosure.

The method 600 begins at step 602, where the synchronization monitor 314 detects that one or more non-executing workgroups have become ready to execute. Many reasons for why workgroups are non-executing are described herein. Some examples include that the workgroup has executed a wait instruction, the workgroup has been descheduled by the kernel scheduler 309, or the workgroup has not yet begun executing. Although some example reasons for why a workgroup is non-executing are described, those of skill in the art will recognize that other reasons for why a workgroup is non-executing may exist. After being converted to a non-executing workgroup, workgroups are not ready to execute, in the sense that such workgroups are not executing and are not placed into any ready queue 316. Certain events cause non-executing workgroups to become ready to execute. If the kernel associated with a workgroup is descheduled by the kernel scheduler 309, then when the kernel scheduler 309 context-switches that kernel back in, the workgroups of that kernel become ready to execute (assuming those workgroups are otherwise ready to execute). If a workgroup is made non-executing due to executing a wait instruction, then the workgroup is considered ready to execute when the wait condition is met. A workgroup may also be made ready to execute upon requesting that a kernel execute. Although some ways in which a workgroup may be made ready to execute are described, other ways are possible as well.

At step 604, the synchronization monitor 314 places the one or more workgroups into one or more ready queues 316 based on the synchronization status for the one or more workgroups. In an example that is provided, there are five possible synchronization statuses: the workgroup was made ready due to a wait condition for the workgroup being satisfied (queue 316(1)); the workgroup was in a critical section when descheduled by the kernel scheduler 309, and was made ready due to the kernel scheduler 309 context-switching the kernel back in (queue 316(2)); the workgroup executed an ordered atomic instruction, was descheduled by the kernel scheduler 309, and was made ready to the kernel scheduler 309 context-switching the kernel back in (queue 316(3)); the workgroup was descheduled but not participating in synchronization operations (i.e., does not fit into the categories for queue 316(1), queue 316(2), or queue 316(3)); and the workgroup has not yet begun executing. The synchronization monitor 314 places a workgroup into the queue 316 corresponding to the synchronization status of the workgroup.

At step 606, the synchronization monitor 314 receives an indication that computing resources are available for execution of one or more ready workgroups. In an example, there is at least one SIMD unit 138 that is free and can execute at least one wavefront of a workgroup. In other examples, a sufficient number of other resources, such as memory or registers, become available to execute at least one wavefront of the workgroup. At step 608, the synchronization monitor 314 instructs the workgroup scheduler 308 to schedule one or more workgroups for execution. The workgroups are selected for execution in the order of priority of the queues 316. The synchronization monitor 314 selects workgroups from higher priority queues before selecting workgroups from lower priority queues. The ordered workgroups queue 316(3) is a priority queue based on workgroup order. Therefore, the synchronization monitor 314 selects workgroups based on their associated order, which may be different from their insertion order.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, kernel scheduler 309, the workgroup scheduler 308, the synchronization monitor 314, or the atomic ALU 502) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be mask works that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for scheduling workgroups for execution on an accelerated processing device ("APD"), the method comprising:
   detecting that one or more non-executing workgroups are ready to execute;
   placing the one or more non-executing workgroups into one or more ready queues based on the synchronization status of the one or more workgroups;
   detecting that computing resources are available for execution of one or more ready workgroups; and
   scheduling for execution one or more ready workgroups from the one or more ready queues in an order that is based on the relative priority of the ready queues, wherein the one or more ready queues comprise a first queue containing workgroups with wait conditions satisfied and a second queue containing workgroups that were pre-empted by a kernel scheduler while in a critical section, wherein the first queue has higher priority than the second queue;
   executing the one or more ready workgroups in the order based on the scheduling.

2. The method of claim 1, wherein detecting that one or more non-executing workgroups are ready to execute comprises:
   detecting that a wait condition for a first workgroup of the one or more non-executing workgroups is satisfied.

3. The method of claim 2, wherein placing the one or more non-executing workgroups into one or more ready queues based on the synchronization status of the one or more workgroups comprises:
   placing the first workgroup into the first queue.

4. The method of claim 1, wherein detecting that one or more non-executing workgroups are ready to execute comprises:
   detecting that a kernel that was pre-empted by the kernel scheduler while a first workgroup of the kernel was in a critical section is re-scheduled for execution.

5. The method of claim 4, wherein placing the one or more non-executing workgroups into one or more ready queues based on the synchronization status of the one or more workgroups comprises:
   placing the first workgroup into the second queue.

6. The method of claim 1, wherein detecting that one or more non-executing workgroups are ready to execute comprises:
  detecting that a first workgroup has executed an atomic ordering operation.

7. The method of claim 6, wherein placing the one or more non-executing workgroups into one or more ready queues based on the synchronization status of the one or more workgroups comprises:
  placing the first workgroup into a third ready queue associated with workgroups that are pre-empted by the kernel scheduler after the workgroups have executed an atomic ordering operation that failed to acquire a lock or critical section.

8. The method of claim 1, wherein:
  the one or more ready queues further comprise a third queue for workgroups that are preempted by the kernel scheduler after executing an ordered atomic instruction, a fourth queue for workgroups that were pre-empted out by the kernel scheduler but not participating in synchronization operations, and a fifth queue for workgroups that have not yet been scheduled, wherein the second queue has higher priority than the third queue, the third queue has higher priority than the fourth queue, and the fourth queue has higher priority than the fifth queue.

9. The method of claim 1, further comprising:
  specifying synchronization status of the one or more workgroups using atomic operations.

10. A workgroup scheduling system comprising:
  a memory; and
  a workgroup scheduler configured to:
    detect that one or more non-executing workgroups are ready to execute;
    place the one or more non-executing workgroups into one or more ready queues of the memory based on the synchronization status of the one or more workgroups;
    detect that computing resources are available for execution of one or more ready workgroups; and
    schedule for execution one or more ready workgroups from the one or more ready queues in an order that is based on the relative priority of the ready queues, wherein the one or more ready queues comprise a first queue containing workgroups with wait conditions satisfied and a second queue containing workgroups that were pre-empted by a kernel scheduler while in a critical section, wherein the first queue has higher priority than the second queue;
  the workgroup scheduling system executes the one or more ready workgroups in the order based on the scheduling.

11. The workgroup scheduling system of claim 10, wherein detecting that one or more non-executing workgroups are ready to execute comprises:
  detecting that a wait condition for a first workgroup of the one or more non-executing workgroups is satisfied.

12. The workgroup scheduling system of claim 11, wherein placing the one or more non-executing workgroups into one or more ready queues based on the synchronization status of the one or more workgroups comprises:
  placing the first workgroup into the first queue.

13. The workgroup scheduling system of claim 10, wherein detecting that one or more non-executing workgroups are ready to execute comprises:
  detecting that a kernel that was pre-empted by the kernel scheduler while a first workgroup of the kernel was in a critical section is re-scheduled for execution.

14. The workgroup scheduling system of claim 13, wherein placing the one or more non-executing workgroups into one or more ready queues based on the synchronization status of the one or more workgroups comprises:
  placing the first workgroup into the second queue.

15. The workgroup scheduling system of claim 10, wherein detecting that one or more non-executing workgroups are ready to execute comprises:
  detecting that a first workgroup has executed an atomic ordering operation.

16. The workgroup scheduling system of claim 15, wherein placing the one or more non-executing workgroups into one or more ready queues based on the synchronization status of the one or more workgroups comprises:
  placing the first workgroup into a third ready queue associated with workgroups that are pre-empted by the kernel scheduler after the workgroups have executed an atomic ordering operation that failed to acquire a lock or critical section.

17. The workgroup scheduling system of claim 10, wherein:
  the one or more ready queues further comprise a third queue for workgroups that are preempted by the kernel scheduler after executing an ordered atomic instruction, a fourth queue for workgroups that were pre-empted out by the kernel scheduler but not participating in synchronization operations, and a fifth queue for workgroups that have not yet been scheduled, wherein the second queue has higher priority than the third queue, the third queue has higher priority than the fourth queue, and the fourth queue has higher priority than the fifth queue.

18. The workgroup scheduling system of claim 10, wherein synchronization status of the one or more workgroups is specified using atomic operations.

19. An accelerated processing device comprising:
  a compute unit;
  a memory; and
  a workgroup scheduler configured to:
    detect that one or more non-executing workgroups are ready to execute;
    place the one or more non-executing workgroups into one or more ready queues of the memory based on the synchronization status of the one or more workgroups;
    detect that computing resources are available for execution of one or more ready workgroups; and
    schedule for execution one or more ready workgroups from the one or more ready queues in an order that is based on the relative priority of the ready queues, wherein the one or more ready queues comprise a first queue containing workgroups with wait conditions satisfied and a second queue containing workgroups that were pre-empted by a kernel scheduler while in a critical section, wherein the first queue has higher priority than the second queue;
  the accelerated processing device executes the one or more ready workgroups in the order based on the scheduling.

20. The accelerated processing device of claim 19, wherein detecting that one or more non-executing workgroups are ready to execute comprises:

detecting that a wait condition for a first workgroup of the one or more non-executing workgroups is satisfied.

\* \* \* \* \*